A. VETTER.
MEANS FOR STORING AUTOMOBILE CURTAINS.
APPLICATION FILED NOV. 30, 1917.
1,358,041.
Patented Nov. 9, 1920.
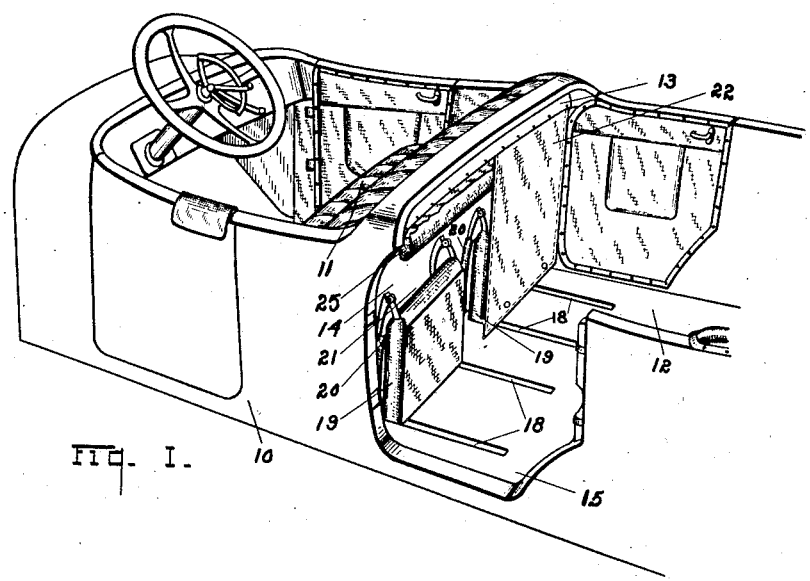
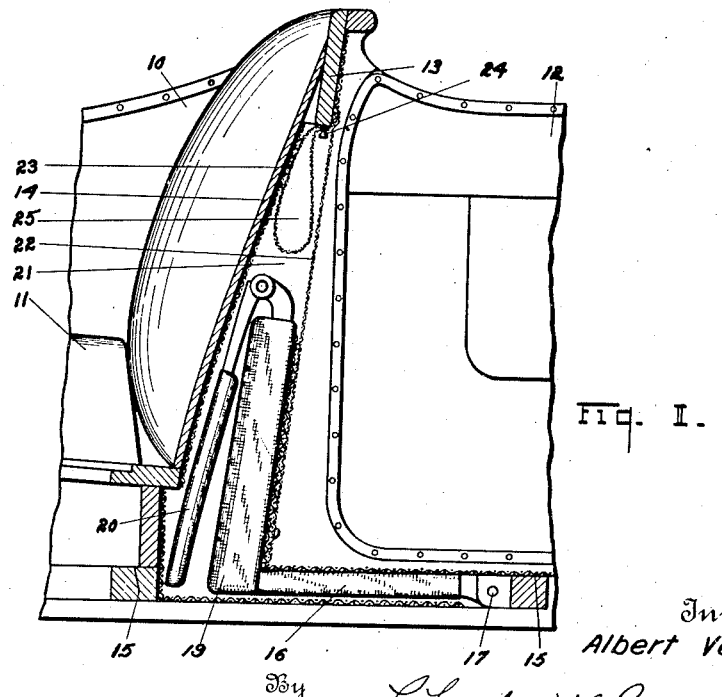
Inventor
Albert Vetter

UNITED STATES PATENT OFFICE.

ALBERT VETTER, OF TOLEDO, OHIO, ASSIGNOR TO THE WILLYS-OVERLAND COMPANY, OF TOLEDO, OHIO, A CORPORATION OF OHIO.

MEANS FOR STORING AUTOMOBILE-CURTAINS.

1,358,041.   Specification of Letters Patent.   Patented Nov. 9, 1920.

Application filed November 30, 1917. Serial No. 204,617.

*To all whom it may concern:*

Be it known that I, ALBERT VETTER, a citizen of the United States, residing at Toledo, in the county of Lucas and State of Ohio, have invented certain new and useful Improvements in Means for Storing Automobile-Curtains, of which I declare the following to be a full, clear and exact description.

This invention relates to improved means for storing the side curtains of an automobile when said side curtains are not in use.

The principal object of this invention is to provide, in connection with a motor vehicle, improved means for storing the side curtains of said motor vehicle when not in use, which storage means shall be readily accessible in case it is necessary to use the curtains, without disturbing the occupants of the vehicle.

A further object of my invention is to provide an improved means for storing the curtains of a motor vehicle, which shall be of such a nature that the curtains will be effectively concealed when not in use, so that the curtain storage will not detract from the sightliness of the motor vehicle.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a perspective view of a motor vehicle embodying my invention, one of the doors being removed and parts being broken away in order to show my invention more clearly.

Fig. II is an enlarged, detail, sectional view, taken through the driver's seat, and showing my curtain storage means in cross section.

In the drawings, similar reference numerals refer to similar parts throughout the several views.

Considering the numbered parts of the drawing, I have shown an automobile body 10 having a front or driver's seat 11, and a rear compartment 12, in which are located the rear seats. A ledge 13 extends transversely across from one side of the body to the other, forming the upper edge of the front seat and supporting the upper part of the back 14 of the front seat. The floor of the vehicle is represented at 15. Folding seats are provided, having legs 16, which are pivoted to the floor at 17, and move in the slots 18 provided in the floor. The seats 19 and the folding backs 20 of the folding seats are stored in the compartment 21 which is provided behind the back 14 of the front seat, and below the ledge 13 extending across the body of the vehicle at the back of the front seat. This compartment 21 is normally closed and covered by a curtain 22, which is secured at its upper edge to the ledge 13 and drops to the floor so that the folding seats are effectively concealed.

I provide a strip of fabric 23, which is secured at one edge to the lower edge of the ledge 13, as shown in Fig. II of the drawing. The strip of fabric 23 is permanently attached at its upper edge to the lower edge of the ledge 13 and the free edge of said strip of fabric 23 is secured to the lower edge of the ledge 13 by means of the detachable fasteners 24, so that said strip of fabric forms a pocket 25 which extends downwardly from the ledge 13, in the upper part of the compartment 21, and in which the curtains may be stored when not in use.

From the description of the parts given above, the operation of this device should be very readily understood. When the curtains are folded and placed in the pocket 25, this pocket normally hangs in the compartment 21, and is covered by the curtains 22, which drops from the ledge 13 down to the floor, and which covers not only the curtain 25, but also the folding seats, which are stored in said compartment. When it is desired to use the side curtains, the curtains 22 are lifted and thrown over the back of the front seat, and the detachable fasteners 24 are unfastened, allowing the front of the pocket 25 to drop down so that the driver may get access to the curtains folded and stored therein. It will be seen that this can be readily accomplished without disturbing the passengers or the driver, and that, furthermore, when the curtains are not in use, they are stored away out of sight and in such a way that the sightliness of the motor vehicle is not affected because of a bulging, irregular parcel formed of the rolled curtains stored away.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. The combination with a motor vehicle provided with a ledge extending between the side walls of the body thereof, in the rear of the front seat, and forming a compartment behind the front seat and below said ledge; of a curtain secured to said ledge and depending therefrom to the floor of the motor vehicle; and a strip of fabric secured to the lower edge of said ledge and depending in said compartment, the free edge of said strip of fabric being adapted to be secured by detachable fasteners to the lower edge of said ledge, whereby a curtain pocket is formed, depending from said ledge, within said compartment.

2. The combination with a motor vehicle provided with a ledge extending between the side walls of the body thereof, in the rear of the front seat and forming a compartment behind the front seat and beneath said ledge; of a folding seat normally disposed in the lower part of said compartment; a curtain storage pocket depending from said ledge, in the upper part of said compartment; and a curtain secured to said ledge and depending therefrom to the floor of the vehicle, and normally closing said compartment and concealing the curtain storage pocket and the seat stored therein.

In testimony whereof, I affix my signature.

ALBERT VETTER.